United States Patent Office
3,290,195
Patented Dec. 6, 1966

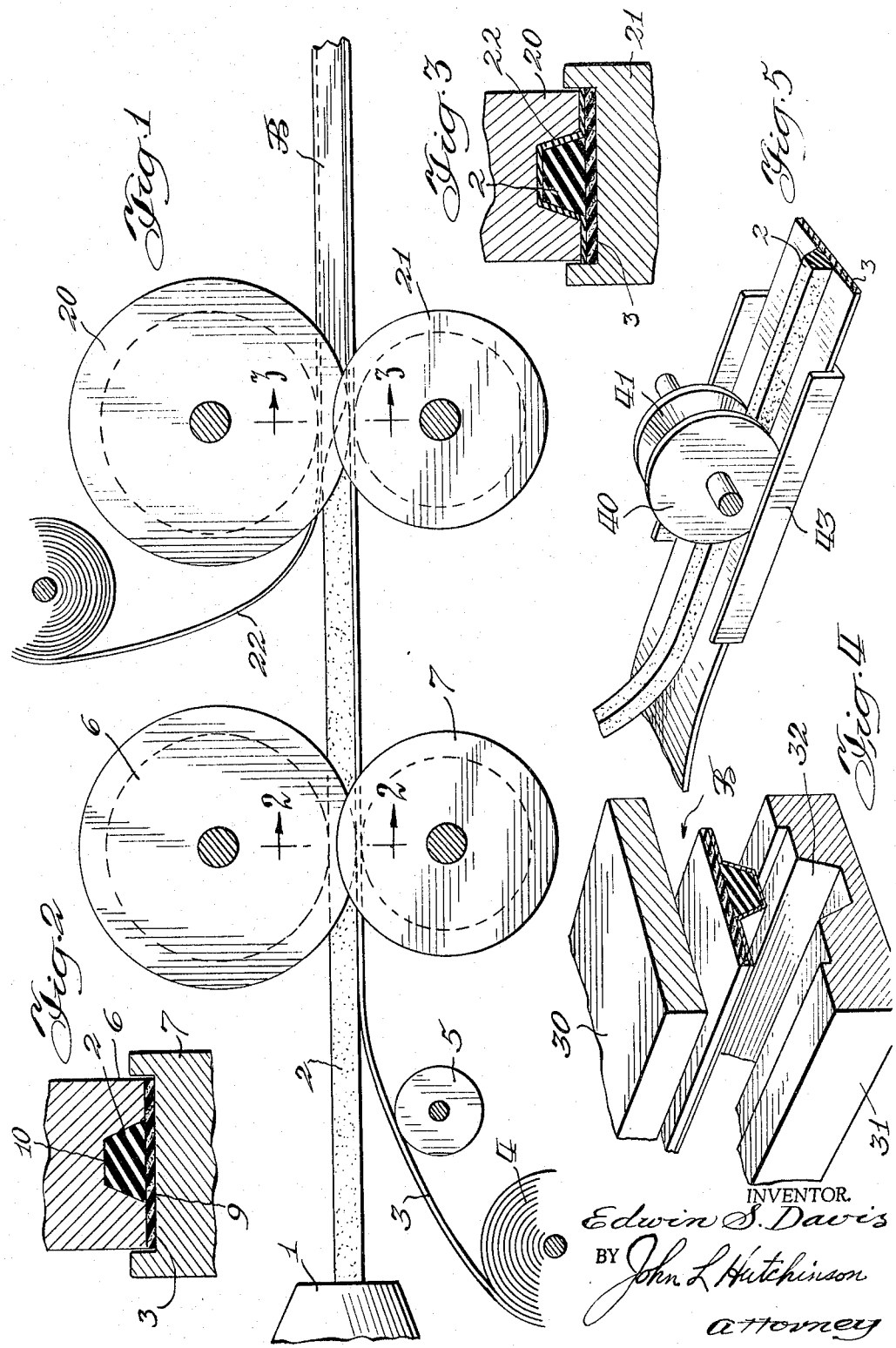

3,290,195
METHOD OF MAKING A V-BELT
Edwin S. Davis, Hopewell Junction, N.Y., assignor to Chemical Rubber Products, Inc., Beacon, N.Y.
Original application Nov. 4, 1963, Ser. No. 321,043. Divided and this application June 11, 1965, Ser. No. 463,181
4 Claims. (Cl. 156—139)

The present invention is concerned with molded belts, particularly of the V belt type for use on grooved pulleys or drive wheels. This application is a division of application Serial No. 321,043 filed November 4, 1963, now abandoned.

Currently, many V belts are made by molding rubber strips, frequently containing fabric reinforcements, in suitable heated molds whereby the rubber is vulcanized and the strip permanently shaped. Some manufacturing methods contemplate molding a large belt having spaced sections of a general trapezoidal design and subsequently severing the large belt between the raised sections to form smaller individual belts. In other practices the smaller V belts are manufactured individually.

For certain applications or for purposes of reinforcement, the outer surfaces of V belts are sometimes provided with a fabric layer. Excessive disintegration of the rubber, resulting from continuous abrasion between the belt and pulleys or drive wheels, will cause accumulation of a fine dust. This may have appreciable disadvantages particularly where cleanliness is important such as in the food or dry cleaning industries wherein conveyor or drive belts are frequently employed. In those applications wherein the surfaces of the belt may be subjected to excessive wear, it has been found desirable to provide a wearing surface which comprises an imbedded fabric to prevent disintegration of the rubber. Exemplary patents illustrating the prior art are Chilton 1,729,329 and Evans 2,439,043.

New techniques for manufacturing belting are constantly under development for the purpose of enhancing properties, improving production and decreasing costs. Thus, many new applications for belting require more rigid operating characteristics. Similarly, demand for belting has increased and to meet such demand more automated equipment must be developed without, however, materially affecting costs.

Accordingly, it is one of the primary objects of this invention to provide a new, substantially continuous method for manufacturing V-type belting.

Another object is to provide a new method of applying a fabric to the wearing surface of V belts.

A further object is the provision of methods of the foregoing type which lend themselves to volume production of belting at competitive costs.

These and other objects will become more apparent from the drawings and specification describing the invention in more detail hereinafter.

In the drawings:
FIGURE 1 discloses the general assembly apparatus which may be used in forming V belts of the type contemplated by the present invention.

FIGURE 2 is a partial elevation, in cross section, taken along line 2—2 of FIGURE 1, illustrating a means of initially assembling the two sections of the belt.

FIGURE 3 is a partial elevation, in cross section, taken along line 3—3 of FIGURE 1, illustrating a means of initially applying a surface fabric to the preliminary belt assembly.

FIGURE 4 discloses a mold for permanently uniting all components to the belt assembly as an integral unit FIGURE 5 illustrates a modified mechanism for initially assembling the two sections of the belt.

In brief, the present invention contemplates continuously supplying a vulcanizable elastomer rib, applying the rib to a supporting vulcanizable elastomeric ribbon or base normally having a width somewhat larger than the width of the rib, applying a fabric to at least the wearing surfaces of the rib and subjecting the assembly to a molding operation to cure the rubber of the two sections and form an integral belting.

Referring to the drawing and initially to FIGURE 1, the numeral 1 designates an extrusion nozzle which may be associated with compounding equipment not shown. A vulcanizable rubber rib 2, whose composition has been previously compounded from the required components, is shown as being extruded from nozzle 1, having, in cross section, a trapezoidal configuration.

Immediately beneath rib 2 is provided a flat, substantially self-sustaining ribbon or base 3 which is simultaneously advanced beneath and in the same direction as rib 2 and is subsequently united thereto as described hereinafter. Ribbon 3 is likewise composed of a vulcanizable uncured rubber stock which may contain fabric reinforcement, as is characteristic of many belt designs. As shown, ribbon 3 may be supplied from any suitable source such as from a roll 4. However, it may be supplied from an appropriate forming machine which continuously applies a coating to or impregnates a base fabric with the desired vulcanizable rubber composition. Normally, a guide roll 5 is employed to support ribbon 3 prior to its association with rib 2.

Rib 2 and ribbon 3 are brought into contact and initially united by means of two superimposed cooperative pressure rollers 6 and 7 which align the rib and base and cause them to be tightly pressed together. Preferably, one or both of the opposing surfaces of the rib and base are rendered sufficiently tacky such that, by application of pressure, the two belt members adhere together and form a preliminary, more or less, self-sustaining assembly until subjected to the aforementioned molding operation whereby they are permanently united. In some instances sufficient tack may be obtained by swabbing the desired surfaces with an appropriate solvent, for example, toluene, where the rubber component is neoprene.

As can be seen in FIGURE 2, which is a cross section on line 2—2 of FIGURE 1, the lower roller 7 is provided with a peripheral recess 9 adapted to receive the upper roller 6. This latter roller is also provided with a peripheral recess 10 having a trapezoidal cross sectional configuration corresponding to that of the rib 2.

As the rib 2 approaches the initial assembly point it is channeled into recess 10 of roller 6. Correspondingly, as the ribbon 3 approaches the initial assembly point it is channeled in recess of roller 7. When the two members thus pass through the rollers they are properly aligned and subjected to sufficient pressure to cause the desired adherence and united into a preliminary assembly. The rollers 6 and 7 may be adjusted to compensate for variations in the members as well as for purposes of modifying the pressure exerted on the rib and ribbon. In addition, the rollers insure proper alignment of the rib 2 and ribbon 3 whereby the former is longitudinally located in the center of the latter.

Subsequent to the preliminary assembly as described above, the aforementioned protective fabric may be applied next by an appropriate means such as, for example, two additional cooperative rollers as are used in the preliminary assembly. As shown in FIGURES 1 and 3 the preliminary assembly of the rib and ribbon is continuously moved forward toward a second pair of cooperative rollers 20 and 21. The periphery of the rollers 20 and 21 are designed in a manner somewhat similar to the design of rollers 6 and 7, as shown in FIGURE 3, whereby the design conforms to the desired configuration of the members forming the belt.

As the preliminary assembly is advanced toward the rollers 20 and 21, the desired fabric layer 22 is deposited or applied to the wearing surface from a suitable source. Application is accomplished by advancing the fabric simultaneously with the assembly as it passes between rollers 20 and 21, as illustrated in FIGURES 1 and 3. Sufficient pressure is employed to insure adherence of the fabric to the surface of the belt. Normally, the fabric is applied to at least the outer surface of the rib 2 and may be applied to the lateral associated surface of the ribbon base 3.

Under some circumstances it may be necessary to use an adhesive to provide temporary union of the fabric with the belt prior to final curing of the assembly. As an alternate, the fabric 22 may be applied by introducing it at the first stage, namely, by use of rollers 6 and 7 with the whole preliminary assembly being formed simultaneously.

The resulting preliminary assembly B is transferred to a mold, such as is indicated in FIGURE 4. The mold is composed of two sections 30 and 31. Section 31 is provided with a recess 32 having the general configuration of the assembly. After the assembly has been placed in the lower mold section 31 the top section is closed under pressure and the belt subjected to heat. Vulcanization or curing of the elastomeric binder occurs which results in the formation of a relatively hard integral product with all fabric firmly imbedded. A molding operation such as described may be performed on successive sections of a continuous belt B by advancing the belt periodically after each section has been subjected to cure.

An alternate means of assembling the rib and ribbon is illustrated in FIGURE 5. In this arrangement a roller 40 is employed having a suitable peripheral recess 41 of a configuration complementary to that of the rib part of the belt. Roller 40 is analogous to roller 6 of FIGURE 1. However, the lower roller 7 of FIGURE 1 is replaced with a smooth surface channel guide 43 through which the belt components are advanced. This alternate mechanism may be used in forming the preliminary assembly of the belt components in the same manner as described in connection with the complementary rollers of FIGURE 1.

The fabric applied to the wear surface of the belt, as indicated, may be formed from any suitable fibrous material which will serve to reduce disintegration of the rubber without appreciably affecting the operating characteristics, or ability of the belt to cooperate with drive pulleys, etc. For most applications a surface fabric of woven nylon fibers is preferred. Further, while most belting of the type described is composed of a cured elastomer or rubber composition, any similar plastic or resinous composition capable of permitting an integral unit to be formed, as described herein, may be used and, particularly, heat-curable resinous compositions which may be set and molded.

Having described the invention and certain exemplary embodiments thereof, the same is only intended to be limited by the scope of the following claims.

I claim:

1. A method of making a belt which comprises continuously advancing a rib and ribbon-like base in longitudinal alignment wherein the rib is supported by the base and the base has a width greater than that of the rib, said rib and base being composed of a heat-curable composition, uniting said rib and base as a preliminary assembly, applying a fabric to at least the exposed surface of said rib in a longitudinal direction and subjecting the preliminary assembly to a molding operation under heat and pressure whereby said composition is cured and said assembly formed as an interal unit.

2. A method as described in claim 1 wherein said heat-curable composition is primarily rubber and said fabric is applied to the exposed surface of the rib and base.

3. A method as described in claim 2 wherein said rib and base are sufficiently tacky, and said uniting of the rib and base includes the application of a solvent to at least one of the opposing surfaces to adhere the two together temporarily.

4. A method as described in claim 1 wherein said method includes a prior step of forming the rib by continuous extrusion.

References Cited by the Examiner

UNITED STATES PATENTS

| | | | |
|---|---|---|---|
| 2,044,356 | 6/1936 | Keeran | 156—199 |
| 2,446,310 | 8/1948 | Steinke | 74—233 |
| 2,511,330 | 6/1950 | Custer | 74—233 |
| 2,582,294 | 1/1952 | Stober | 264—210 X |
| 2,607,713 | 8/1952 | Waugh | 156—140 |
| 3,012,926 | 12/1961 | Wintermute et al. | 156—199 |
| 3,068,136 | 12/1962 | Reid | 156—244 X |

FOREIGN PATENTS 634,465   3/1950   Great Britain.

EARL M. BERGERT, *Primary Examiner.*

DAVID J. WILLIAMOWSKY, *Examiner.*

J. A. WONG, P. DIER, *Assistant Examiners.*